(12) United States Patent
Rong

(10) Patent No.: US 11,362,554 B2
(45) Date of Patent: Jun. 14, 2022

(54) PERMANENT MAGNETS WITH SOFT MATERIAL LAYERS

(71) Applicant: Ford Global Technologies, LLC, Dearborn, MI (US)

(72) Inventor: Chuanbing Rong, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 16/438,937

(22) Filed: Jun. 12, 2019

(65) Prior Publication Data

US 2020/0395800 A1  Dec. 17, 2020

(51) Int. Cl.
| | |
|---|---|
| *H02K 1/27* | (2022.01) |
| *H02K 1/276* | (2022.01) |
| *H02K 21/14* | (2006.01) |
| *H02K 1/2713* | (2022.01) |
| *H01F 1/059* | (2006.01) |
| *H01F 1/057* | (2006.01) |

(52) U.S. Cl.
CPC .......... *H02K 1/2773* (2013.01); *H01F 1/059* (2013.01); *H01F 1/0572* (2013.01); *H02K 1/2713* (2013.01); *H02K 21/14* (2013.01); *H02K 2201/03* (2013.01); *H02K 2201/06* (2013.01)

(58) Field of Classification Search
CPC .... H02K 1/2773; H02K 21/14; H02K 1/2713; H02K 2201/06; H02K 2201/03; H02K 1/2766; H02K 1/02; H01F 1/059; H01F 1/0572
See application file for complete search history.

(56) References Cited

U.S. PATENT DOCUMENTS

| | | | |
|---|---|---|---|
| 6,805,980 B2 | 10/2004 | Uehara | |
| 9,373,433 B2 | 6/2016 | Johnson et al. | |
| 2014/0210581 A1 | 7/2014 | Lewis et al. | |
| 2016/0329784 A1* | 11/2016 | Tamura | ................... F25B 31/02 |
| 2018/0053586 A1 | 2/2018 | Rong | |
| 2019/0068008 A1* | 2/2019 | Gao | ...................... H01F 7/0278 |

* cited by examiner

*Primary Examiner* — Thomas Truong
(74) *Attorney, Agent, or Firm* — David B Kelley; Brooks Kushman P.C.

(57) ABSTRACT

A rotor of an electric machine includes a rotor core with one or more permanent magnets having opposing ends. The rotor core defining a magnet channel extending axially between opposing ends of the rotor core. The permanent magnet is disposed in the channel and extends axially through the rotor core. The magnet includes a planar layer of magnetically hard-phase material that includes rare-earth metal and includes a planar layer of magnetically soft-phase material that does not include rare-earth metal. Both of the hard and soft layers extend between the opposing ends. The soft-phase material has a major face disposed against a major face of the hard phase material.

20 Claims, 4 Drawing Sheets

PERMANENT MAGNETS WITH SOFT MATERIAL LAYERS

TECHNICAL FIELD

This disclosure relates to permanent magnets for electric machines, and more specifically to permanent magnets having soft-phase magnetic material.

BACKGROUND

Many automobile manufacturers are producing electric and hybrid-electric vehicles to improve fuel economy and reduce pollution. These vehicles include a traction battery and one or more electric machines powered by the traction battery. Each electric machine includes a stator and a rotor that is supported for rotation within the stator. The rotor is mounted on a shaft that is driveably connected to the driven wheels by one or more powertrain components. One type of rotor has embedded permanent magnets. Torque produced by the electric machine is sent to the driven wheels by the powertrain components to propel the vehicle.

SUMMARY

According to one embodiment, a rotor of an electric machine includes a rotor core with one or more permanent magnets having opposing ends. The rotor core defining a magnet channel extending axially between opposing ends of the rotor core. The permanent magnet is disposed in the channel and extends axially through the rotor core. The magnet includes a planar layer of magnetically hard-phase material that includes rare-earth metal and includes a planar layer of magnetically soft-phase material that does not include rare-earth metal. Both of the hard and soft layers extend between the opposing ends. The soft-phase material has a major face disposed against a major face of the hard phase material. The major face of the soft-phase material is oriented to be within plus-or-minus 30 degrees of perpendicular to a magnetically easy crystallographic axis of the magnet.

According to another embodiment, a rotor of an electric machine includes a rotor core defining a magnet channel extending axially between opposing ends of the rotor core. A permanent magnet is disposed in the channel and extends axially through the rotor core. The magnet is a rectangular prism having opposing ends, opposing major sides extending between the opposing ends, and opposing minor sides extending between the opposing ends and between the major sides. The permanent magnet includes a planar layer of a magnetically hard-phase material that include rare-earth metal. The layer of hard-phase material has opposing major faces extending between the opposing ends and opposing minor faces extending between the opposing major faces and forming first portions of the minor sides. The magnet further includes a planar layer of a magnetically soft-phase material that does not include rare-earth metal. The layer of soft-phase material has opposing major faces extending between the opposing ends and opposing minor faces extending between the opposing major faces of the soft-phase material and forming second portions of the minor sides.

According to yet another embodiment, a permanent magnet has a magnetically easy crystallographic axis. The magnet includes a first planar layer of magnetically hard-phase material having opposing end faces, opposing first and second major faces extending between the opposing end faces, and opposing minor faces extending between the opposing major faces and extending between the opposing end faces. The magnet further includes a second planar layer of magnetically soft-phase material having opposing end faces, opposing first and second major faces extending between the opposing end faces, and opposing minor faces extending between the opposing major faces and extending between the opposing end faces. The magnet also includes a third planar layer of magnetically hard-phase material having opposing end faces, opposing first and second major faces extending between the opposing end faces, and opposing minor faces extending between the opposing major faces and extending between the opposing end faces. Wherein, the first, second, and third layers are stacked such that the first major face of the first layer is adjacent the first major face of the second layer and the first major face of the third layer is adjacent the second major face of the second layer, and the major faces of the layers are oriented to be substantially perpendicular to the magnetically easy crystallographic axis.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
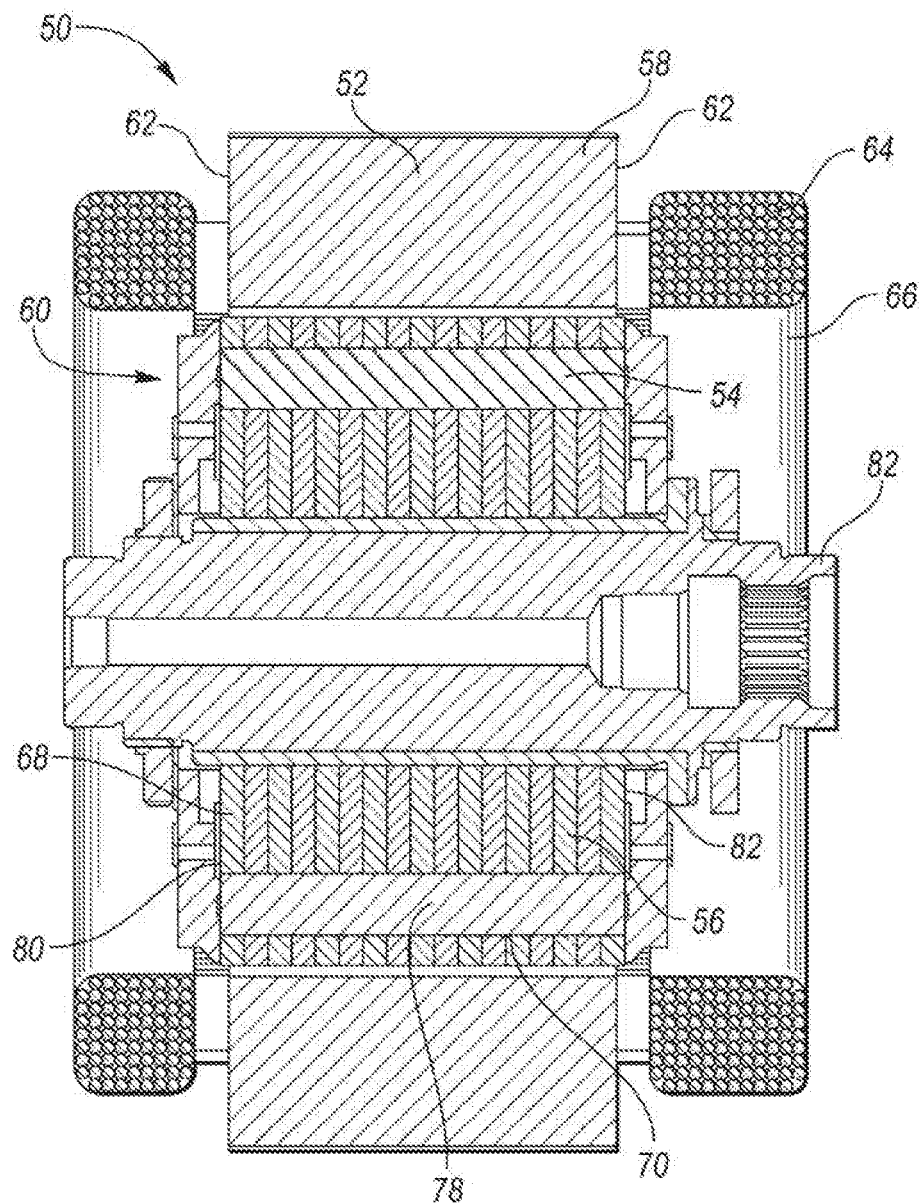
FIG. 1 is a diagrammatical side view, in cross section, of an electric machine.

Referring to FIG. 1, an electric or hybrid electric vehicle may include an electric machine 50 for propelling the vehicle. The electric machine 50 may act as a motor and/or a generator depending upon operating conditions. The electric machine 50 may be a permanent-magnet AC machine. While described as an electric machine for a vehicle, the electric machine 50 may be used in a wide range of applications.

The electric machine 50 may include a stator 52 having a plurality of laminations (not shown). Each of the laminations includes a front side and a back side. When stacked, the front and back sides are disposed against adjacent front and back sides to form a stator core 58. Each of the laminations may be doughnut shaped and define a hollow center. Each lamination also includes an outer diameter (or outer wall) and an inner diameter (or inner wall). The outer diameters cooperate to define an outer surface of the stator core 58, and the inner diameters cooperate to define a cavity 60.

Each lamination may include a plurality of teeth extending radially inward toward the inner diameter. Adjacent teeth cooperate to define slots. The teeth and the slots of the laminations are aligned with each other to define stator slots extending through the stator core 58 between the opposing end faces 62. The end faces 62 define the opposing ends of the core 58 and are formed by the first and last laminations of the stator core 58. A plurality of windings (also known as coils, wires, or conductors) 64 are wrapped around the stator core 58 and are disposed within the stator slots. The windings 64 may be disposed in an insulating material (not shown). Portions of the windings 64 generally extend in an axial direction along the stator slots. At the end faces 62 of the stator core, the windings may bend to extend circumferentially around the end faces 62 of the stator core 58 forming end windings 66. While shown as having distributed windings, the windings could also be of the concentrated or hairpin type.

Figure 2:
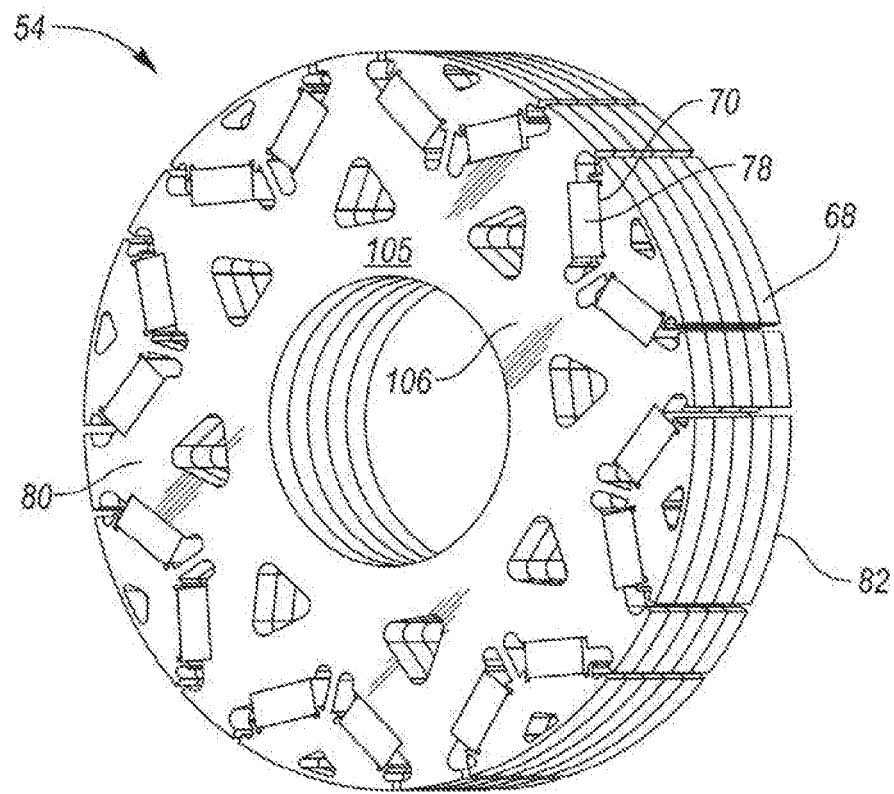
FIG. 2 is a perspective view of a rotor.

Referring to FIGS. 1 and 2, a rotor 54 is disposed within the cavity 60 and supported for rotation relative to the stator 52, which is typically a stationary component. The rotor 54 may be supported on a shaft 82 and positioned inside the stator 52 so that an air gap is formed between the rotor 54 and the stator 52. When current is supplied to the stator 52, a rotating magnetic field is created in the stator 52 causing the rotor 54 to spin generating a torque. The shaft 82 is configured to output the torque to another component such as a gearbox.

The rotor 54 has a rotor core 56 that may be formed of a plurality of stacked laminations 68. The laminations are typically steel plates but may be formed of any material having a high magnetic permeability. The rotor core 56 may define one or more magnet pockets 70 that are circumferentially arranged around the rotor core 56. Each of the magnet pockets may extend from one end 80 of the core 56 to the other end 82. A plurality of permanent magnets 78 are embedded in the rotor core 56 with each magnet 78 being disposed in one of the pockets 70 and extending axially through the rotor core 56. The magnet 78 may have a length that substantially matches the length of the core 56 so that the magnets 78 extend from the end 80 to the end 82.

A typical permanent magnet for use in an electric machine is made from rare-earth metals and may include compounds such as $Nd_2Fe_{14}B$, $SmCo_5$, $Sm_2Co_{17}$, combinations thereof, and the like. These compounds of rare-earth metals may also include small percentages of other rare-earth metals to enhance properties of the magnets. Rare-earth metals are used in permanent magnets due to their favorable coercivity. Rare-earth metals are expensive due to their scarcity. As electric motors become more and more popular, the potential supply of rare-earth metals further diminishes driving costs even higher. This disclosure sets forth more cost-effective permanent magnets that have reduced concentrations of rare-earth metals while still maintaining adequate coercivity and other desirable properties.

Figure 3:
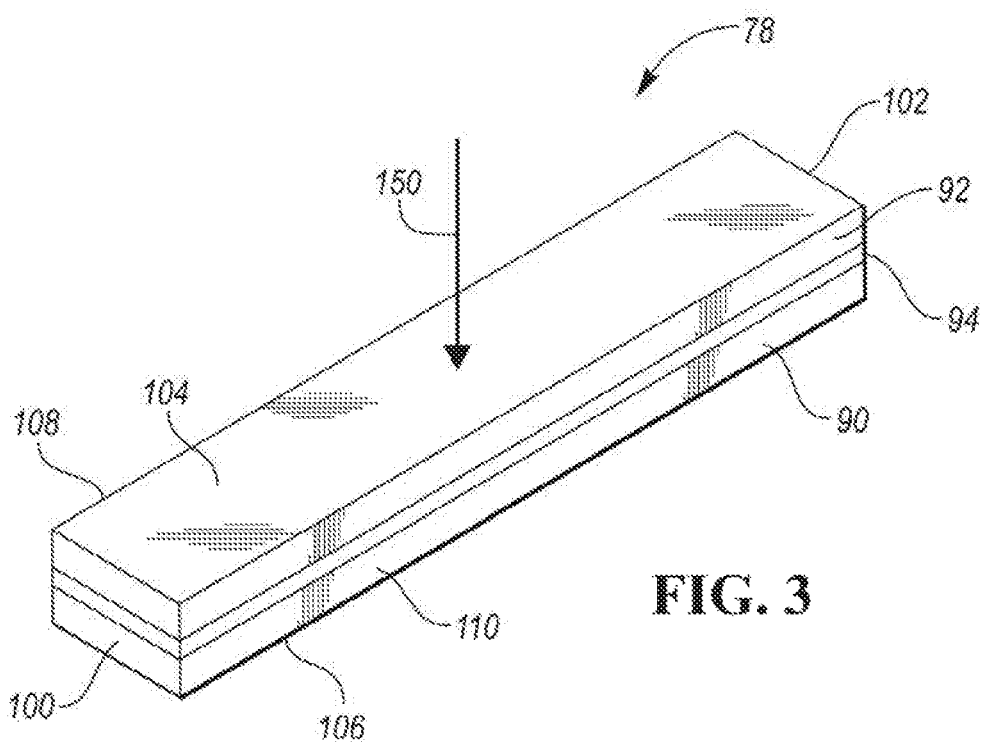
FIG. 3 is a perspective view on the permanent magnet for use in the rotor.
Figure 4:
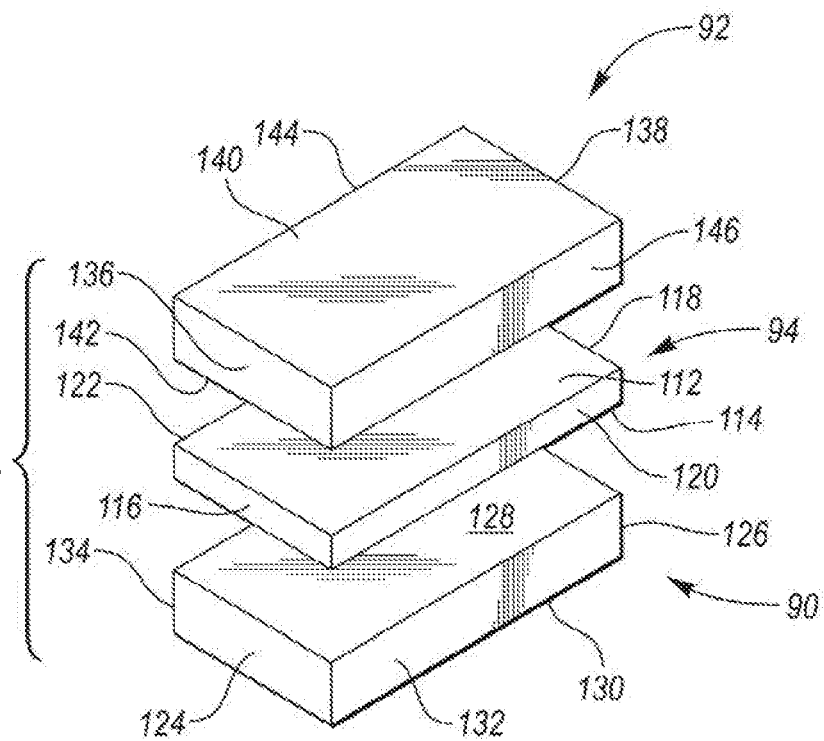
FIG. 4 is an exploded perspective view of the magnet of FIG. 3.

Referring to FIGS. 3 and 4, the permanent magnet 78, according to one or more embodiments, includes layers or other sections or portions of magnetically hard-phase material that include rare-earth metal(s) and magnetically soft-phase material that do not include rare-earth metal. In the illustrated embodiment, the magnet 78 includes a first layer of hard-phase material 90, a second layer of hard-phase 92, and a third layer of soft-phase material 94 that is sandwiched between the first and second layers 90, 92.

Magnetically hard-phase materials usually have high coercivity to provide anti-demagnetizing ability during motor operation. Typical magnetically hard-phase materials include $Nd_2Fe_{14}B$, $Sm_2Co_{17}$, $SmCo_5$, MnBi, SmFeN, etc. Magnetically soft-phase materials usually have low coercivity but high polarization which provide high magnetic flux. Typical magnetically soft-phase materials include Fe, Co, FeCo, FeNi, FeN, etc.

In the illustrated embodiment, the permanent magnet 78 is a rectangular prism having opposing ends 100, 102, opposing major sides 104, 106 extending between the ends 100, 102, and opposing minor sides 108, 110 that extend between the major sides and between the opposing ends. In this embodiment, each of the layers 90, 92, 94 may also be a rectangular prism. For example, the soft-phase layer may include opposing end faces 116, 118, major faces 112, 114 extending between the ends, and opposing minor faces 120, 122 extending between the major faces and between the opposing end faces. (The terms "side" and "face" were chosen for ease of description and do not imply any structural differences between them.) The first hard-phase layer 90 may include opposing end faces 124, 126, major faces 128, 130 extending between the ends, and opposing minor faces 132, 134 extending between the major faces and between the opposing end faces. The second hard-phase layer 92 may include opposing end faces 136, 138, major faces 140, 142 extending between the ends, and opposing minor faces 144, 146 extending between the major faces and between the opposing end faces.

The layers 90, 92, 94 may be stacked with the major face 128 of the first hard-phase material 90 disposed against the major face 114 of the soft-phase material 94 and with the major face 112 of the soft-phase material 94 disposed against the major face 142 of the second hard-phase material 92. The layers 90, 92, 94 are axially and horizontally aligned so that the end faces are substantially flush with each other and the minor faces are also substantially flush with each other so that the finished magnet is a generally rectangular prism having straight sides. In this arrangement, the major face 140 of the hard-phase layer 92 forms the major side 104 of the magnet and the major face 130 of the hard-phase layer 90 forms the major side 106. The ends 100 and 102 of the magnet 78 are formed of the collection of end faces of the layers 90, 92, 94, and the minor sides 108, 110 are formed of the collection of minor faces of the layers 90, 92, 94.

The magnet 78 has a magnetically easy crystallographic axis (easy axis)150. The magnet 78, like many magnets, is magnetically anisotropic. This means there are two directions that are easiest to magnetize the material. These two directions are 180 degrees apart and thus can be referred to as a single axis since direction is not relevant for the purposes of this application. The line parallel to these directions is called the easy axis 150 and refers to an energetically favorable direction of spontaneous magnetization. In the illustrated embodiment, the easy axis 150 is perpendicular to the major sides 104, 106 of the magnet 78.

In the illustrated embodiment, the layers 90, 92, 94 are oriented so that the major faces are substantially perpendicular to the easy axis 150. Used herein, "substantially perpendicular" means within ±5 degrees of true perpendicular. In other embodiments, one or more of the layers 90, 92, 94 may be oriented to be within ±30 degrees of perpendicular to the easy axis 150. For example, the soft-phase material 94 may be oriented to be within ±30 degrees of perpendicular to the easy axis 150. In other embodiments, one or more of the layers 90, 92, 94 may be oriented to be within ±15 degrees of perpendicular to the easy axis 150. For example, soft-phase material 94 may be oriented to be within ±15 degrees of perpendicular to the easy axis 150.

Figure 5:
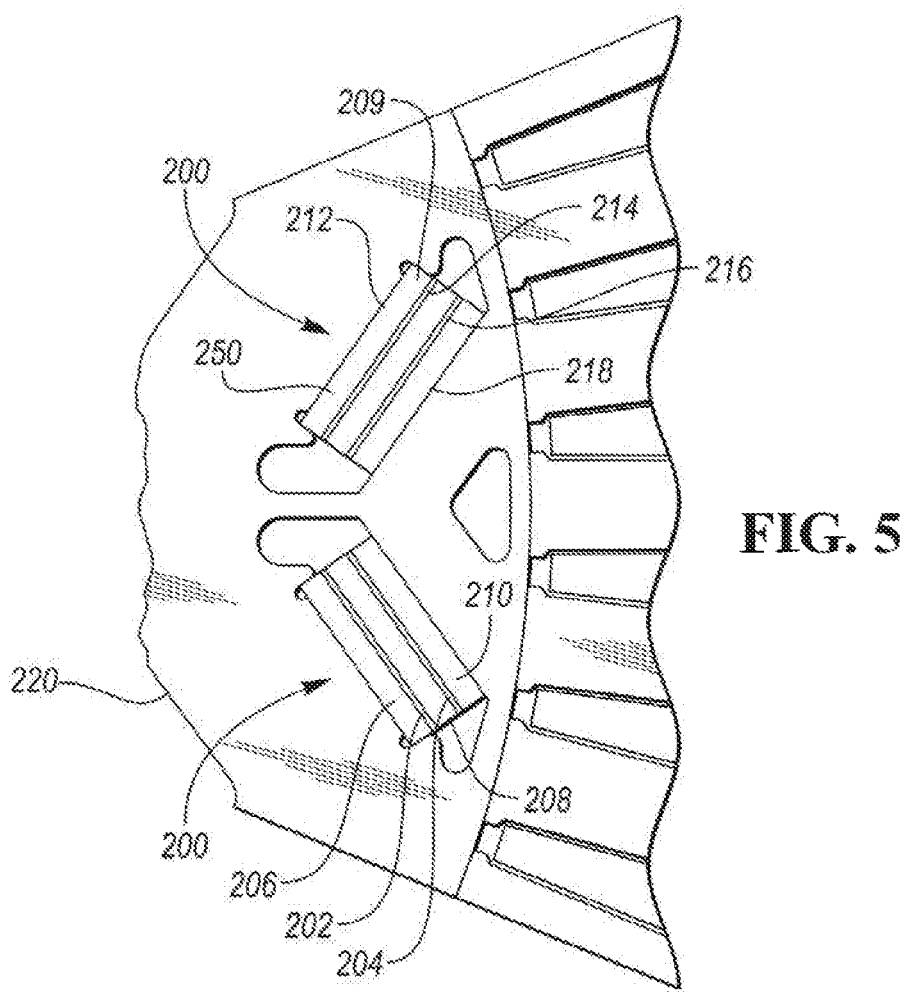
FIG. 5 is a partial end view of a rotor having a permanent magnet according to an alternative embodiment.

Referring to FIG. 5, the permanent magnet may include multiple soft-phase layers. For example, a permanent magnet 200 may include two soft-phase layers 202, 204 and three hard-phase layers 206, 208, 210. In the illustrated embodiment, the permanent magnet 200 is a rectangular prism having opposing ends 209, opposing major sides 212 extending between the ends 210, and opposing minor sides 214 that extend between the major sides and between the opposing ends. In this embodiment, each of the layers may also be a rectangular prism. For example, each layer may include opposing end faces 216, major faces 218 extending between the end faces, and opposing minor faces 220 extending between the major faces and between the opposing end faces. The layers may be stacked such that the hard and soft layers alternate. For example, the hard phase layer 206 is an outer layer and has the first soft-phase layer 202 disposed against it. Next, the middle hard-phase layer 208 is disposed against the first soft-phase layer 202. The second soft-phase layer 204 is disposed against the middle layer 208. Lastly, the hard-phase layer 210 is disposed against the second soft-phase layer 204.

Like the magnet 78, layers may be oriented so that the major faces are substantially perpendicular to the easy axis 250. This places the first and second soft-phase layers 202, 204 to be substantially parallel to each other. In this context, "substantially parallel" means within ±5 degrees of parallel.

The hard-phase layers may be thicker or thinner (distance between opposing major faces) than the soft-phase layers. The thickness of the soft-phase layers depends on the final magnetic properties of the entire magnet 78. For example, the thickness of a soft-phase layer may be between 5 to 20 percent of the thickness of a hard-phase layer, without significantly affecting the coercivity of the entire magnet. According to one embodiment, the hard-phase layers may be between 2 and 6 millimeters (mm) and the soft-phase layers may be between 0.1 and 1.0 mm. All of the hard-phase layers of the magnet may have a substantially same thickness or each layer may be designed to have different thicknesses. Similarly, in magnets having multiple soft-phase layers, these layers may have the same thickness or may be different thicknesses.

Figure 6:
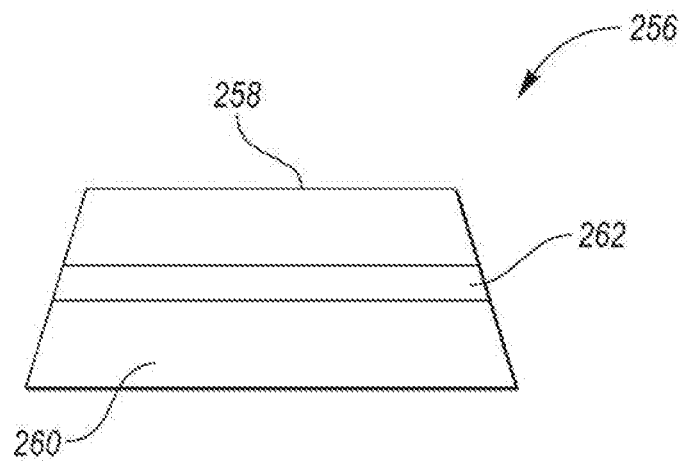
FIG. 6 is an end view of another permanent magnet.

While the above embodiments are shown as being rectangular prisms, the magnets may have other shapes in different embodiments. For example, the shape of magnet could be trapezoidal, as shown in FIG. 6. Referring to FIG. 6, a permanent magnet 256 may be a trapezoidal prism including layers of hard and soft phase materials. The magnet 256 may include a pair of hard-phase layers 258, 260 that are sandwiching a soft-phase layer 262. Of course, in other embodiments, the magnet 256 may include more than one soft-phase layer and additional hard-phase layers as described above. The individual layers of the magnet 256 may also be trapezoidal prisms. In other embodiments, the permanent magnets may be round or other type of prism.

Figure 7:
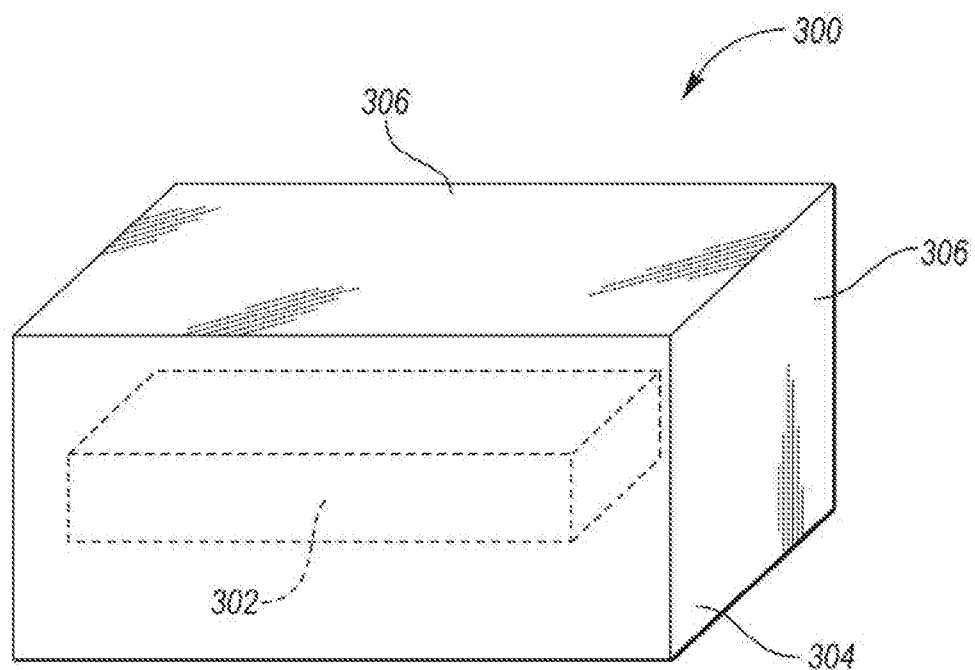
FIG. 7 is a perspective view of yet another permanent magnet.

The hard-phase materials and the soft-phase materials do not necessarily have to be stacked layers as shown above. Referring to FIG. 7, a permanent magnet 300 includes a soft-phase material 302 embedded within a hard-phase material 304. In this example, the hard-phase material 304 defines the outer sides 306 of the permanent magnet to completely encapsulate the soft-phase material 302. In other embodiments, the soft-phase material 302 may be shifted towards the periphery of the permanent magnet so that at least one of the outer sides 306 is partially defined by the soft-phase material 302. In the illustrated embodiment, the magnet 300 includes a single soft-phase material 302 disposed within the hard-phase material 304, but in other embodiments, the magnet 300 may include multiple soft-phase materials disposed within the hard-phase material 304.

While the above embodiments discuss hard-phase and soft-phase layers and encapsulation, other embodiments may include hard-phase and semi-hard-phase materials that are arranged as described above. Semi-hard magnetic material has moderate coercivity and may include CoFeNi, CoFeV, CoFrCr, AlNiCo, ferrite, and the like. In other embodiments, a magnet may include multiple different layers of hard-phase material rather than layers of hard and soft phase material.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A rotor of an electric machine comprising:
  a rotor core defining a magnet channel extending axially between opposing ends of the rotor core; and
  a permanent magnet disposed in the channel, extending axially through the rotor core, and having opposing ends, the magnet including:
    a planar layer of magnetically hard-phase material, that includes rare-earth metal, extending between the opposing ends, and
    a planar layer of magnetically soft-phase material, that does not include rare-earth metal, extending between the opposing ends and having a major face disposed against a major face of the hard phase material, wherein the major face of the layer of soft-phase material is oriented to be within plus-or-minus 30 degrees of perpendicular to a magnetically easy crystallographic axis of the magnet.

2. The rotor of claim 1, wherein the magnet further includes a second planar layer of magnetically hard-phase material extending between the opposing ends, the second layer having a major face disposed against another major face of the layer of soft-phase material.

3. The rotor of claim 1, wherein the magnet further includes a second planar layer of magnetically soft-phase material extending between the opposing ends, wherein the layer of hard-phase material is sandwiched between the layers of soft-phase material.

4. The rotor of claim 3, wherein the layer of soft-phase material and the second layer of soft-phase material are substantially parallel to each other.

5. The rotor of claim 1, wherein the major face of the layer of soft-phase material is oriented to be within plus-or-minus 15 degrees of perpendicular to the magnetically easy crystallographic axis of the magnet.

6. The rotor of claim 1, wherein the major face of the layer of soft-phase material is oriented to be within plus-or-minus 5 degrees of perpendicular to the magnetically easy crystallographic axis of the magnet.

7. The rotor of claim 1, wherein the magnet is a rectangular prism having opposing major sides extending between the opposing ends and having minor sides extending between the opposing ends and extending between the major sides of the magnet, wherein the major sides of the magnet are formed of a hard-phase material.

8. The rotor of claim 1, wherein the layer of a soft-phase material is a rectangular prism.

9. The rotor of claim 1, wherein the magnetically hard-phase material includes $Nd_2Fe_{14}B$, $Sm_2Co_{17}$, $SmCo_5$, MnBi, SmFeN, or combinations thereof.

10. A rotor of an electric machine comprising:
a rotor core defining a magnet channel extending axially between opposing ends of the rotor core; and
a permanent magnet disposed in the channel and extending axially through the rotor core, the magnet being a rectangular prism having opposing ends, opposing major sides extending between the opposing ends, and opposing minor sides extending between the opposing ends and between the major sides, the permanent magnet including:
a planar layer of a magnetically hard-phase material that include rare-earth metal, the layer of hard-phase material having opposing major faces extending between the opposing ends and opposing minor faces extending between the opposing major faces and forming first portions of the minor sides, and
a planar layer of a magnetically soft-phase material that does not include rare-earth metal, the layer of soft-phase material having opposing major faces extending between the opposing ends and opposing minor faces extending between the opposing major faces of the soft-phase material and forming second portions of the minor sides.

11. The rotor of claim 10, wherein the planar layer of a soft-phase material is a rectangular prism.

12. The rotor of claim 11, wherein the planar layer of hard-phase material is a rectangular prism.

13. The rotor of claim 10, wherein the planar layer of hard-phase material is thicker than the planar layer of soft-phase material.

14. The rotor of claim 10, wherein the magnet has a magnetically easy crystallographic axis that is substantially perpendicular to the major sides.

15. The rotor of claim 14, wherein the major faces of the soft-phase material are substantially perpendicular to the magnetically easy crystallographic axis.

16. The rotor of claim 10, wherein the magnet further includes a second planar layer of magnetically hard-phase material, that includes rare-earth metal, having opposing major faces extending between the opposing ends and opposing minor faces extending between the opposing major faces of the second layer and forming third portions of the minor sides, wherein the layer of soft-phase material is sandwiched between the layers of hard-phase material.

17. The rotor of claim 10, wherein the magnetically hard-phase materials include $Nd_2Fe_{14}B$, $Sm_2Co_{17}$, $SmCo_5$, MnBi, SmFeN, or combinations thereof.

18. A permanent magnet having a magnetically easy crystallographic axis, the magnet comprising:
a first planar layer of magnetically hard-phase material having opposing end faces, opposing first and second major faces extending between the opposing end faces, and opposing minor faces extending between the opposing major faces and extending between the opposing end faces;
a second planar layer of magnetically soft-phase material having opposing end faces, opposing first and second major faces extending between the opposing end faces, and opposing minor faces extending between the opposing major faces and extending between the opposing end faces; and
a third planar layer of magnetically hard-phase material having opposing end faces, opposing first and second major faces extending between the opposing end faces, and opposing minor faces extending between the opposing major faces and extending between the opposing end faces; wherein
the first, second, and third layers are stacked such that the first major face of the first layer is adjacent the first major face of the second layer and the first major face of the third layer is adjacent the second major face of the second layer, and the major faces of the layers are oriented to be substantially perpendicular to the magnetically easy crystallographic axis.

19. The permanent magnet of claim 18, wherein the first, second, and third layers are further stacked such that the opposing end faces of the layers cooperate to define at least a portion of opposing ends of the permanent magnet.

20. The permanent magnet of claim 18 further comprising:
a fourth planar layer of magnetically soft-phase material having opposing end faces, opposing first and second major faces extending between the opposing end faces, and opposing minor faces extending between the opposing major faces and extending between the opposing end faces; and
a fifth planar layer of magnetically hard-phase material having opposing end faces, opposing first and second major faces extending between the opposing end faces, and opposing minor faces extending between the opposing major faces and extending between the opposing end faces; wherein
the first, second, third, fourth, and fifth layers are stacked such that the first major face of the fourth layer is adjacent the first major face of the third layer and the second major face of the fourth layer is adjacent the first major face of the fifth layer.

* * * * *